(12) United States Patent
Schwager et al.

(10) Patent No.: US 11,347,261 B2
(45) Date of Patent: May 31, 2022

(54) DISPLAY ASSEMBLY WITH GRADIENT TETHERED DESIGN FOR AN ULTRATHIN PORTABLE INFORMATION HANDLING SYSTEM

(71) Applicant: Dell Products L.P., Round Rock, TX (US)

(72) Inventors: Mark Andrew Schwager, Cedar Park, TX (US); Yu-Feng Huang, Hsin-Chu (TW); Kai-Yuan Cheng, Taipei (TW); Chao-Kai Huang, Taipei (TW); Hong-Ji Huang, Kinyi District (TW); Julian Spencer, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 120 days.

(21) Appl. No.: 17/034,359

(22) Filed: Sep. 28, 2020

(65) Prior Publication Data

US 2022/0100227 A1    Mar. 31, 2022

(51) Int. Cl.
*G06F 1/16*    (2006.01)

(52) U.S. Cl.
CPC .................................. *G06F 1/1616* (2013.01)

(58) Field of Classification Search
CPC .... G06F 1/1616; G06F 1/1681; G06F 1/1637; G06F 1/203; G06F 1/206; G06F 2200/201; G06F 2200/203; G06F 1/1618; G06F 1/181; G06F 1/1601; G06F 1/1615; G06F 1/1626; G06F 1/1635; G06F 1/1643; G06F 1/1647; G06F 1/1652; G06F 1/1654; G06F 1/1669; G06F 1/1677; G06F 1/1679; G06F 1/1683; G06F 2200/1634; H05K 7/20327; H05K 7/20381; H05K 7/20136; H05K 7/20209; H05K 7/2029; H05K 7/20336
See application file for complete search history.

(56) References Cited

U.S. PATENT DOCUMENTS

| | | | |
|---|---|---|---|
| 7,561,414 B2 * | 7/2009 | Li | G06F 1/1601 248/617 |
| 9,785,188 B1 * | 10/2017 | Schwager | G06F 1/1654 |
| 10,551,888 B1 * | 2/2020 | North | G06F 1/1677 |
| 2007/0041149 A1 * | 2/2007 | Homer | G06F 1/1616 361/679.27 |
| 2009/0290087 A1 * | 11/2009 | Bauer, Jr | G06F 1/1637 361/679.26 |

(Continued)

*Primary Examiner* — Abhishek M Rathod
(74) *Attorney, Agent, or Firm* — Terrile, Cannatti & Chambers; Stephen A. Terrile

(57) ABSTRACT

A display chassis for a portable information handling system. In various embodiments the display chassis includes a display cover portion, the display cover portion comprising a display and a bezel, the display comprising an infinity display and a rear cover portion, the rear cover portion comprising a timing controller (TCON), the timing controller comprising a first printed circuit board portion and a second printed circuit board portion, the first printed circuit board portion having a corresponding height, the second printed circuit board portion having a corresponding height, the corresponding height of the second printed circuit board portion being taller than the corresponding height of the first printed circuit board portion, the second printed circuit board portion being located within a dome center height area of the rear cover portion.

12 Claims, 7 Drawing Sheets

(56) References Cited

U.S. PATENT DOCUMENTS

2017/0300089 A1\* 10/2017 Hampton ............... G06F 1/1683
2017/0373375 A1\* 12/2017 Bologna ................. H01Q 1/50
2018/0040940 A1\* 2/2018 Bologna ................. H01Q 1/50

\* cited by examiner

DISPLAY ASSEMBLY WITH GRADIENT TETHERED DESIGN FOR AN ULTRATHIN PORTABLE INFORMATION HANDLING SYSTEM

BACKGROUND OF THE INVENTION

Field of the Invention

The present invention relates to information handling systems. More specifically, embodiments of the invention relate to a display assembly for a portable information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a display chassis for a portable information handing system, comprising: a display cover portion, the display cover portion comprising a display and a bezel, the display comprising an infinity display; and, a rear cover portion, the rear cover portion comprising a timing controller (TCON), the timing controller comprising a first printed circuit board portion and a second printed circuit board portion, the first printed circuit board portion having a corresponding height, the second printed circuit board portion having a corresponding height, the corresponding height of the second printed circuit board portion being taller than the corresponding height of the first printed circuit board portion, the second printed circuit board portion being located within a dome center height area of the rear cover portion.

In another embodiment the invention relates to an information handling system comprising: a processor; a data bus coupled to the processor; and an information handling system chassis housing, the housing comprising a base chassis, the base chassis housing the processor; and, a display chassis comprising: a display cover portion, the display cover portion comprising a display and a bezel, the display comprising an infinity display; and, a rear cover portion, the rear cover portion comprising a timing controller (TCON), the timing controller comprising a first printed circuit board portion and a second printed circuit board portion, the first printed circuit board portion having a corresponding height, the second printed circuit board portion having a corresponding height, the corresponding height of the second printed circuit board portion being taller than the corresponding height of the first printed circuit board portion, the second printed circuit board portion being located within a dome center height area of the rear cover portion.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Certain aspects of the invention reflect an appreciation that in important consideration for customers when making a purchase decision for a portable information handling system is a Z form factor (i.e., a height of the portable information handling system when in a closed configuration). Certain aspects of the invention reflect an appreciation that it can be challenging to optimize the Z form factor for certain types of portable information handling systems (such as infinity edge type portable information handling systems).

Certain aspects of the disclosure reflect an appreciation that for aesthetic, strength, and performance reasons, information handling system chassis parts may be designed with a metal structure. A portable information handling system, for example, may include a plurality of covers for the interior components of the information handling system. In these embodiments, a form factor case may include an "A-cover" which serves as a back cover for a display housing and a "B-cover" which may serve as the bezel, if any, and a display screen of the portable information handling system. The portable information handling system may include a "C-cover" housing a keyboard, touchpad, and any cover in which these components are set and a "D-cover" base housing.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
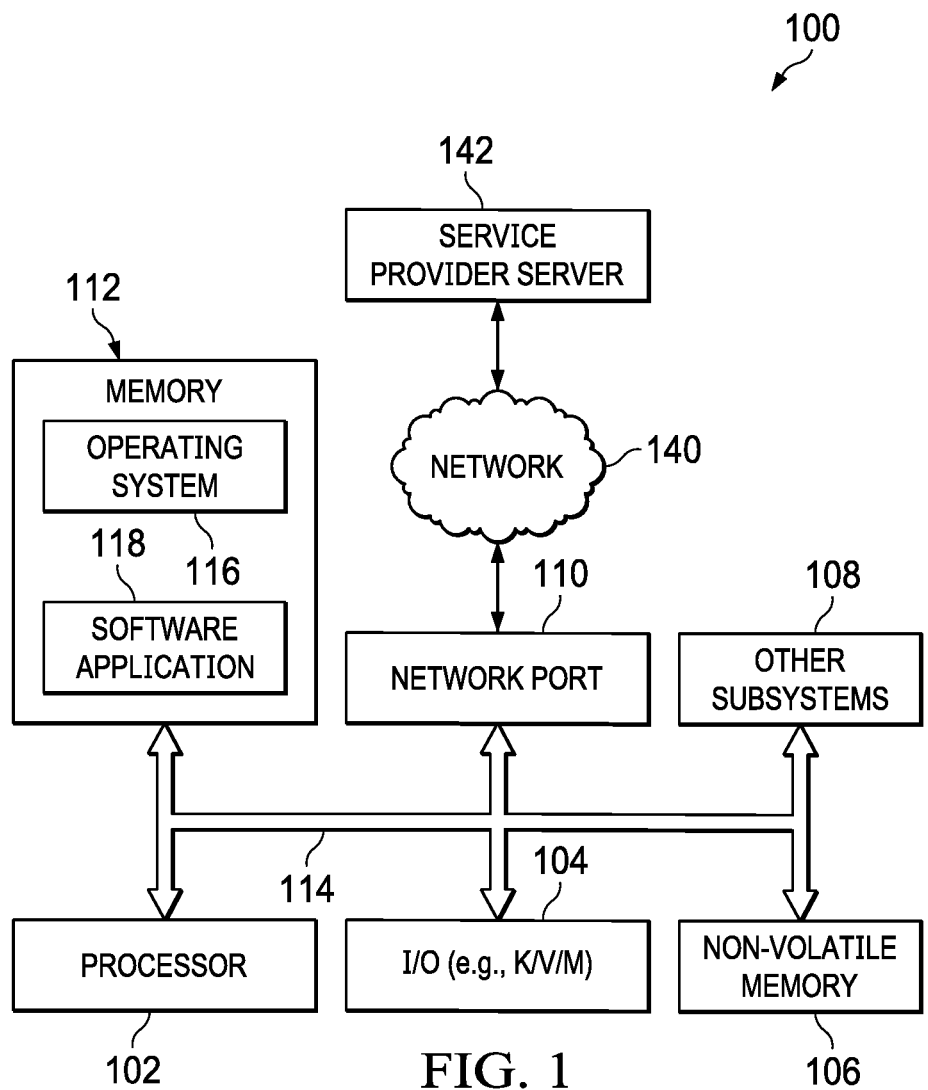
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise at least one software application 118. In one embodiment, the information handling system 100 is able to download the software application from the service provider server 142. In another embodiment, the software application 118 is provided as a service from the service provider server 142.

Figure 2:
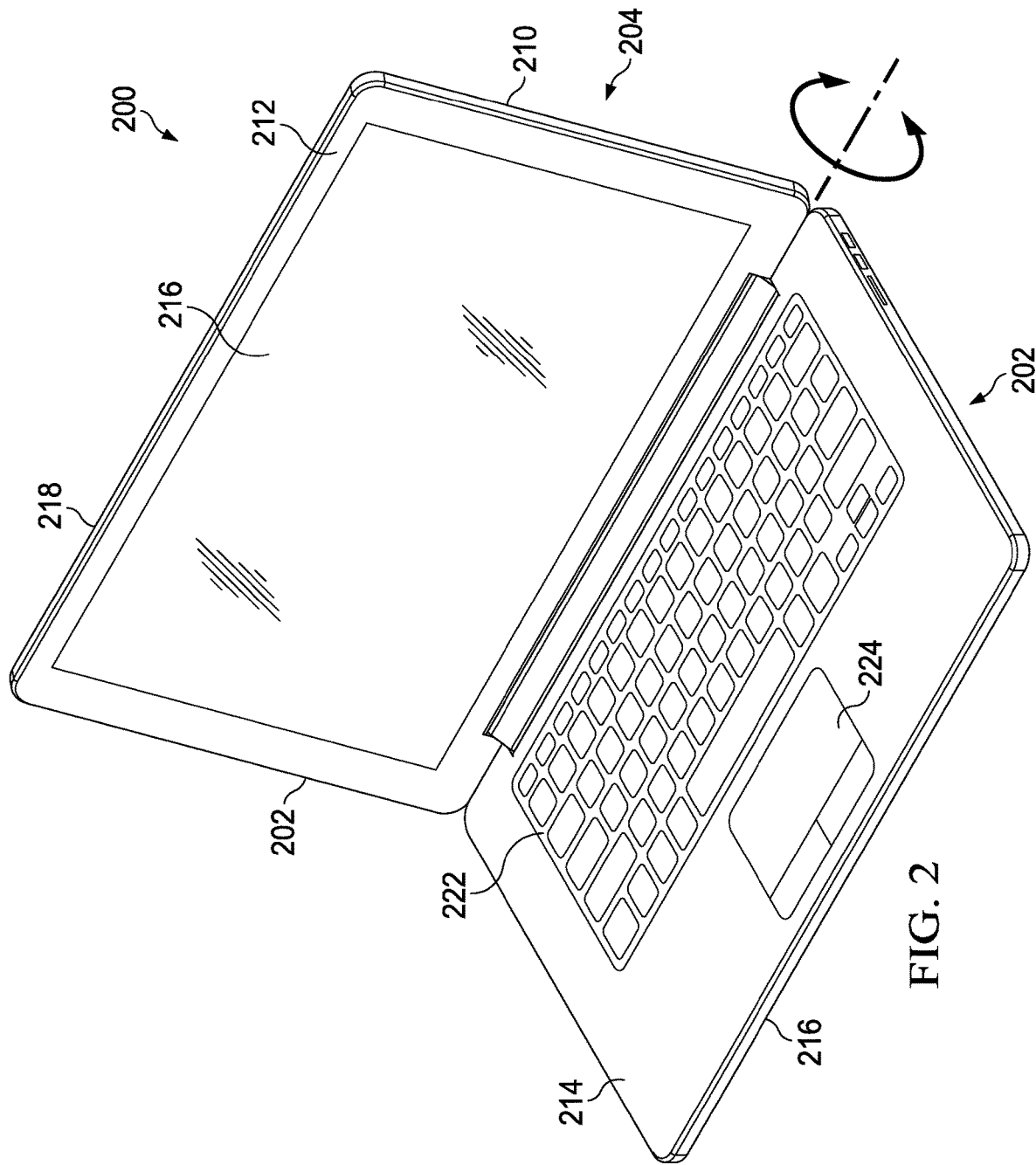
FIG. 2 shows a perspective view of an example portable information handling system.

FIG. 2 shows a perspective view of an example portable information handling system chassis 200 such as a tablet type portable information handling system, a laptop type portable information handling system, or any other mobile information handling system. It will be appreciated that some or all of the components of the information handling system 100 may be included within information handling system chassis 200. The portable information handling system 200 chassis includes a base chassis 202 and a display chassis 204 shown in an open configuration. It will be appreciated that a closed configuration would have the display chassis 204 fully closed onto the base chassis 202.

The base chassis 202 or the display chassis 204 of the information handling system 200 may comprise an outer metal case or shell. The information handling system 200 may include a plurality of chassis portions. In various embodiments, the information handling system 200 may include some or all of an A-Cover 210, a B-Cover 212, a C-cover 214 and a D-Cover 216. In various embodiments, the A-Cover 210 and the B-Cover 212 provide the display chassis 204. In various embodiments, the C-Cover 214 and the D-Cover 216 provide the base chassis 202.

In various embodiments, the A-cover 210 encloses a portion of the display chassis 204 of the information handling system 200. In various embodiments, the B-cover 212 encloses another portion of the display chassis 204 of the information handling system 200. In various embodiments, the B-Cover may include a display screen 216 and a bezel 218 around the display screen.

In various embodiments, the C-cover 214 encloses a portion of the base chassis 202 of the information handling system 200. In various embodiments, the C-cover 214 may include, for example, a keyboard 222, a trackpad 224, or other input/output (I/O) device. In various embodiments, certain components of the information handling system such as a mother board are mounted within the C-Cover 214. In various embodiments, the D-cover 216 encloses another portion of the base chassis 202 of the information handling system 200.

When placed in the closed configuration, the A-cover 202 forms a top outer protective shell, or a portion of a lid, for the information handling system 200, while the D-cover 204 forms a bottom outer protective shell, or a portion of a base, for the information handling system. When in the fully closed configuration, the A-cover 202 and the D-cover 204 would be substantially parallel to one another.

In some embodiments, both the A-cover 202 and the D-cover 204 may be comprised entirely of metal. In some embodiments, the A-cover 202 and D-cover 204 may include both metallic and plastic components. For example, plastic components that are radio-frequency (RF) transparent may be used to form a portion of the C-cover 208.

In various embodiments, the A-cover 202 may be movably connected to a back edge of the D-cover 204 via one or more hinges. In this configuration, the hinges allow the A-cover 202 to rotate from and to the D-cover 204 allowing for multiple orientations of the information handling system 200. In various embodiments, the information handling system may include a sensor to detect the orientation of the information handling system and activate or deactivate any number of antenna systems based on the occurrence of any specific orientation. In some embodiments, the information handling system may be a laptop with limited rotation of the A-cover 204 with regard to the D-cover 204, for example up to 180° rotation arc. In other embodiments the information handling system 200 may be a convertible information handling system with full rotation to a tablet configuration.

Figure 3:
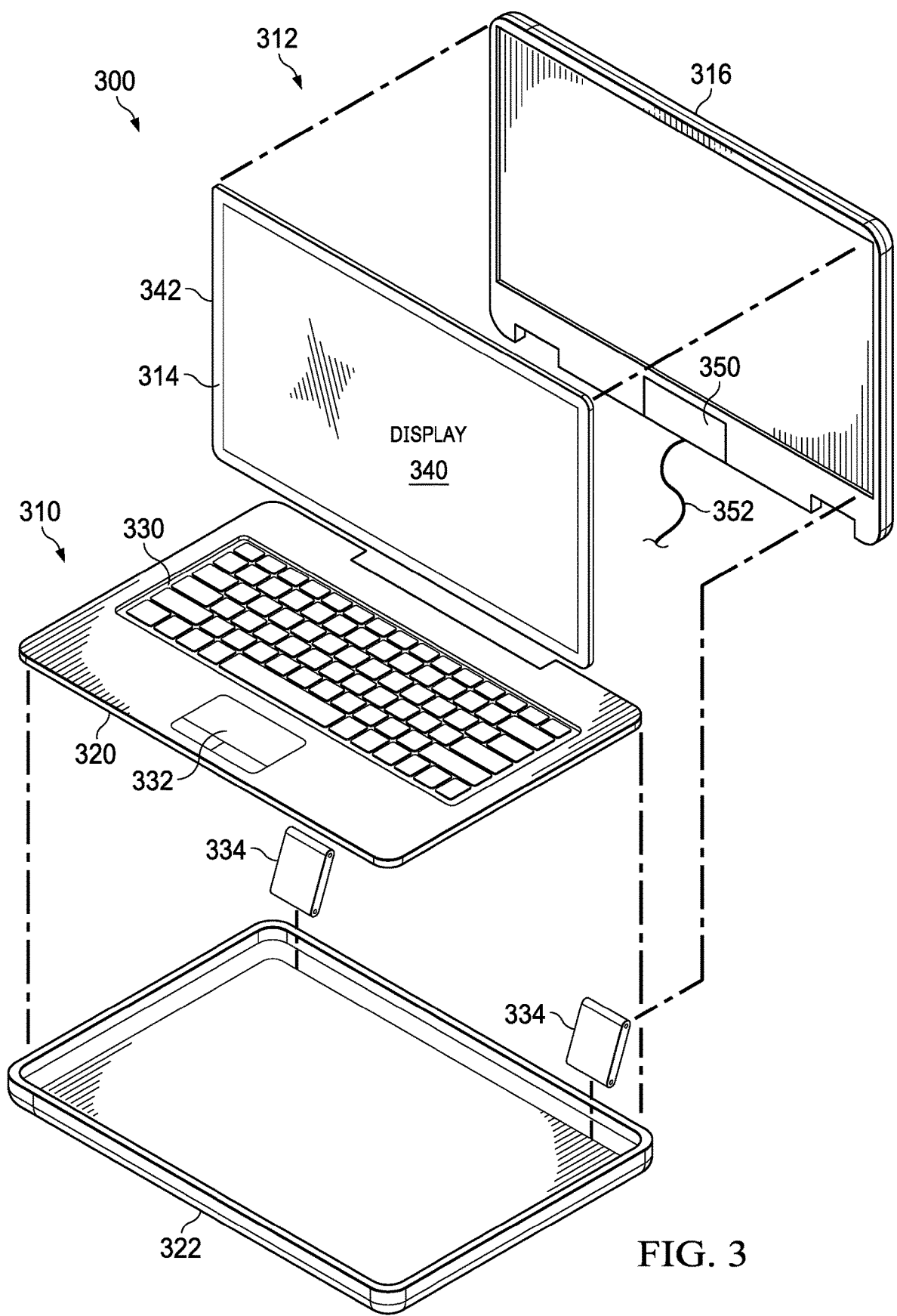
FIG. 3 shows a blown-up view of a portable information handling system.

FIG. 3 shows a blown-up view of a portable information handling system 300 having rotationally-coupled housing portions. In the example embodiment, a main housing portion 310 (which corresponds to a base chassis 202) rotationally couples to a lid housing portion 312 (which corresponds to a display chassis 204) to support various configurations to interact with an end user. Main housing portion 310 may hold one or more components of the portable information handling system, including but not limited to processor 102, system bus 114, memory subsystem 112, I/O subsystem 104 and network interface 110 discussed with respect to FIG. 1. Main housing portion 310 includes a top cover portion 320 (which includes the C-Cover 214) and a bottom cover portion 322 (which includes the D-Cover 216). Lid housing portion 312 includes a display cover portion 314 (which includes the B-Cover 210) and a rear display cover portion 316 (which includes the A-Cover 212). The top cover portion 320 may include an integrated keyboard 330 or other I/O devices, such as a trackpad 332 or microphone (not shown).

Lid housing portion 312 is rotationally coupled to main housing portion 310 via at least one hinge assembly 334. Lid housing portion 212 includes display 340 that visually presents information to the user as well as a bezel 342. Display 340 may be a touch panel with circuitry enabling touch functionality in conjunction with a display. In some embodiments, display 340 may be an "infinity edge" or "narrow bezel" display that approaches one or more the edges of lid housing portion 212 such that bezel may be narrow in size (e. g., less than 10 millimeters) on the edges. For example, display 340 is an infinity display with narrow bezels on the top and sides of lid housing portion 212 in the embodiment shown in FIG. 3. In certain embodiments, the side bezel is less than 4 mm (+/−10%) and the top bezel is less than 6 mm (+/−10%).

Lid housing portion 212 may also include timing controller (TCON) 350. Hinge assembly 330 may include cable 352 for communicably coupling one or more components within main housing portion 310 to one or more components within lid housing portion 312. For example, cable 352 may provide communication of graphics information from an I/O subsystem to TCON 350 for generation of visual images for display on display 340. Although a single cable 352 is shown, portable information handling system 300 may include one or more additional cables 352 for communicating components disposed in main housing portion 310 and lid housing portion 312. Placement of cable 352 may be selected based on design considerations, materials or manufacturing cost, material reliability, antenna placement, as well as any other considerations.

Hinge assembly 334 allows main housing portion 310 and lid housing portion 312 to rotate between a plurality of positions. For example, when portable information handling system 300 is not in use, lid housing portion 312 may be closed over the top of main portion 310 such that display 340 and keyboard 330 are protected from unintended use or damage. Rotation of lid housing portion 312 by approximately 90 degrees from main housing portion 310 brings display 340 in a raised "clamshell" position relative to keyboard 330 so that an end user can make inputs to keyboard 330 or touch panel portion of display 340 while viewing display 340. In some embodiments, clamshell position may represent lid housing portion 212 open between approximately 1 and 180 degrees from main housing portion 310. Rotation of lid housing portion 312 between approximately 180 and 359 degrees from main housing portion 310 may place portable information handling system 300 in "tablet stand" and/or "tent" positions. In tablet stand and tent positions, the user may make inputs via touch panel portion of display 340 while viewing display 340. A full 360 degree rotation of main housing portion 310 relative to lid housing portion 312 provides a tablet configuration having display 340 exposed to accept touch inputs. In any position, user inputs may be communicated to an I/O subsystem or a processor of the portable information handling system 300 for processing, and then updated information may be communicated back via cable 352 to display 340 for displaying to the user. Hinge assembly 334 may be comprised of one or more discrete hinges or a unified assembly of hinges.

Figure 4:
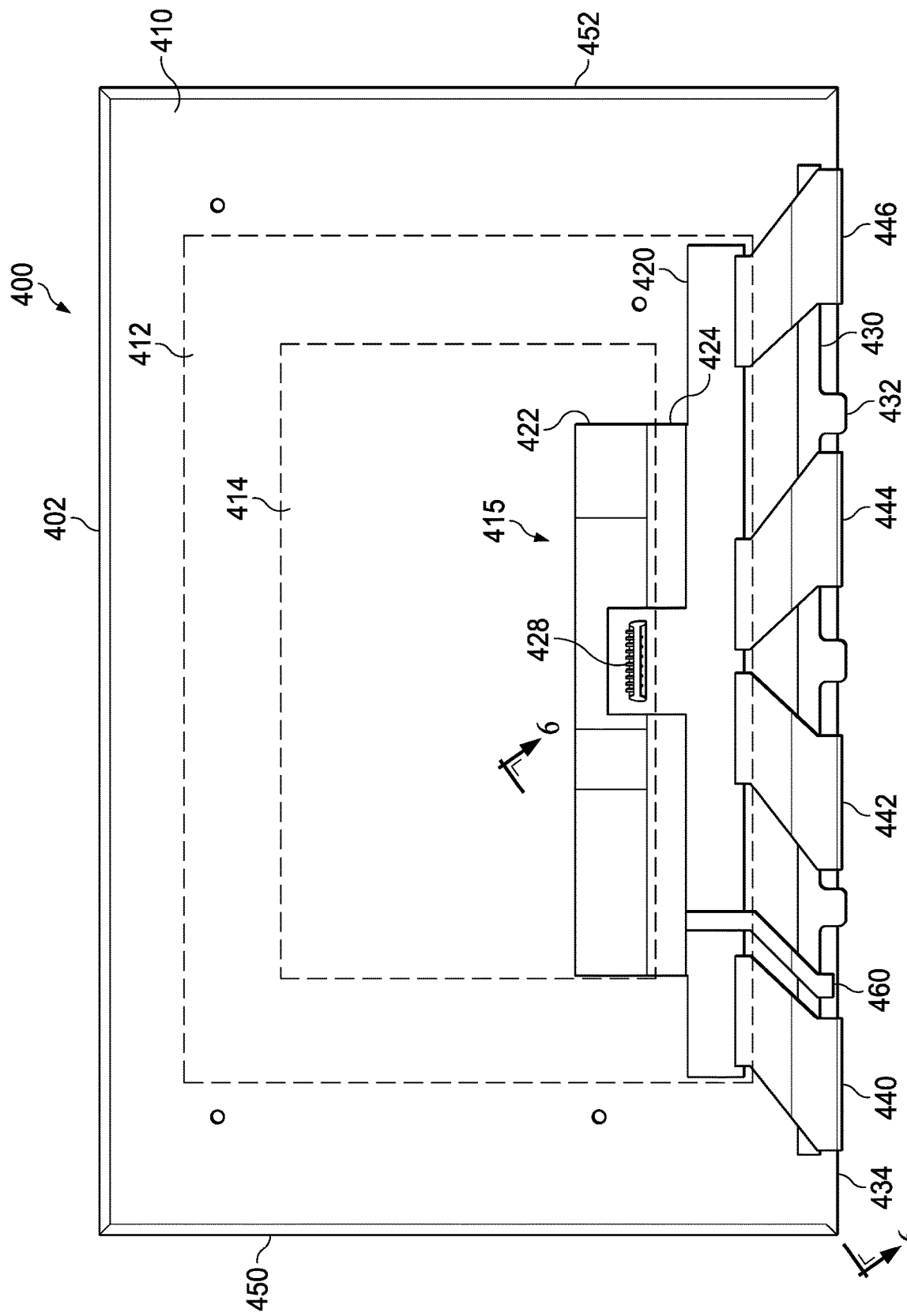
FIG. 4 shows a rear display cover portion facing breakaway view of a lid housing portion of a portable information handling system.

FIG. 4 shows a rear display cover portion facing breakaway view 400 of a lid housing portion 402 of a portable information handling system. In various embodiments, the rear display cover portion facing breakaway view provides a representation of various components of a liquid crystal module (LCM) of the portable information handling system. In various embodiments, the liquid crystal module (LCM) includes a liquid crystal display (LCD), a printed circuit board (PCB), a structural panel as well as an LCM connection portion. In various embodiments, the LCM may be a chip on board (COB) type LCM, a chip on glass (COG) type LCM of a chip on film (COF) type LCM.

Various aspects of the present disclosure include an appreciation that configuring a lid housing portion 402 with its tallest components located towards the center of the housing portion provides a visual perception of a smaller Z form factor. Various aspects of the disclosure include an appreciation that providing a perception of a smaller Z form factor advantageously allows such a portable information handling system to more effectively compete with systems that have smaller Z form factors.

In various embodiments, the lid housing portion is conceptually divided into a plurality of Z-axis height areas. In various embodiments, each Z-axis height area includes a slope to cause the lid housing portion to have a domed appearance. In various embodiments, the lid housing portion is divided into three Z-axis height areas, a dome center height area 410, a mid height area 412 and an edge height area 414. In various embodiments, the dome center height area 410 has a Z-axis height of 5.5 mm (+/−20%). In various embodiments, the mid height area 412 has a Z-axis height of 4.99 mm (+/−20%). In various embodiments, the edge height area 414 has a Z-axis height of 3.8 mm (+/−20%). By providing the plurality of Z-axis height areas, the information handling system has a gradient design ranging from 5.5 mm (+/−20%) to 3.80 mm (+/−20%).

In various embodiments, the lid housing portion 402 includes a multi height printed circuit board (PCB) 415. In various embodiments, the printed circuit board 415 includes a printed circuit board portion 420 (i.e., a first PCB portion). In various embodiments, the printed circuit board 415 includes a printed circuit board (PCB) portion 422 (i.e., a second PCB portion). In various embodiments, the printed circuit board 415 includes a printed circuit board portion 424 (i.e., a third PCB portion). In various embodiments, the PCB portion 420, PCB portion 422 and PCB portion 424 are included within a single multi height printed circuit board 415. In various embodiments, the printed circuit board portion 420, printed circuit board portion 422, printed circuit board portion 424 and electrical components mounted on the printed circuit board 420 and printed circuit board 422 provide a timing controller such as timing controller 350.

In various embodiments, the printed circuit board portion 420 has a corresponding height. In various embodiments, the printed circuit board portion 420 has a maximum height of 1.00 mm (+/−15%). In various embodiments, the printed circuit board portion 422 has a corresponding height. In various embodiments, the printed circuit board portion 422 has a maximum height of 1.65 mm (+/−15%). In various embodiments, the corresponding height of the circuit board portion 420 is different than the corresponding height of the circuit board portion 422. In various embodiments, the corresponding height of the circuit board portion 422 is taller than the corresponding height of the circuit board portion 420. In various embodiments, the printed circuit board portion 424 has a corresponding height. In various embodiments, the corresponding height of the circuit board portion 462 is greater than the corresponding height of the circuit board portion 420 but less than the corresponding height of circuit board portion 422.

In various embodiments, the printed circuit board portion 422 includes a connector 428 for electrically coupling the printed circuit board portion 422 with components contained within the main housing portion 310 (e.g., via a cable 352).

In various embodiments, the printed circuit board portion 420 and printed circuit board portion 422 provide a tiered height printed circuit board. In various embodiments, the tiered height printed circuit board enables location of the highest components of the TCON of the information handling system toward the center of the lid housing portion 402 to provide an optimal A-cover dome profile. In various embodiments, other tall highest components fit within the at least one of a camera logic component and a touch controller component. In various embodiments, the printed circuit board portion 422 is located within the dome center height area 414 of the lid housing portion 402. In various embodiments, the printed circuit board portion 420 is located within the mid-tier height area 414 of the lid housing portion 402.

In various embodiments, the lid housing portion 402 includes a bracket 430. In various embodiments, the bracket 430 includes a plurality of bracket tabs 432 protruding from a main portion of the bracket. In various embodiments, the bracket tabs 432 extend out of the bracket 430 along an X-axis of the lid housing portion 402. In various embodiments, the bracket 430 is adhered to the lid housing portion 402 along a bottom edge 434 of the lid housing portion 402.

In various embodiments, the lid housing portion 402 includes a plurality of display device communication portions 440, 442, 444, 446. In various embodiments, the plurality of display device communication portions 440, 442, 444, 446 are jogged designs that couple to the tiered height printed circuit board portion 422. In various embodiments, at least one of display device communication portions 440, 442 are jogged in a first direction and at least one of display device communication portions 444, 446 are jogged in a second direction. In various embodiments, display device communication portions 440, 442 are jogged to extend inwardly from a left side of the lid housing portion 402. In various embodiments, display device communication portions 444, 446 are jogged to extend inwardly from a right side of the lid housing portion 402.

In various embodiments, each display device communication portion 440, 442, 444, 446 includes a flexible printed circuit (FPC). In various embodiments, display device communication portions 440, 442 include a first signal path routing and display device communication portions 444, 446 include a second signal path routing.

In various embodiments, the bracket tabs 432 are interlaced between the display device communication portions 440, 442, 444, 446. In various embodiments, the bracket 430 and display device communication portions 440, 442, 443, 446 are positioned away from the left edge 450 and right edge 452 of the lid housing portion 402. In various embodiments, positioning bracket 430 and display device communication portions 440, 442, 444, 446 away from the left edge 450 and right edge 452 of the lid housing portion 402 allows a roll off of the bottom portion of the lid housing portion 402 to provide a similar perceived visual thinness along all four sides of the lid housing portion 402. In various embodiments, display device communication portion 440 is angled away from the left edge of the lid housing portion 402 such that the top edge of display device communication portion 440 is substantially aligned (e.g., within 5 mm+/−10%) with the left edge of printed circuit board portion 420. Accordingly, the top edge of the display device communication portion 440 is located within the mid-tier area 414 of the lid housing portion 402. In various embodiments, display device communication portion 446 is angled away from the right edge of the lid housing portion 402 such that the top right edge of display device communication portion 440 is substantially aligned (e.g., within 5 mm+1-10%) with the right edge of printed circuit board portion 420. Accordingly, the top edge of the display device communication portion 446 is located within the mid-tier area 414 of the lid housing portion 402.

Figure 5:
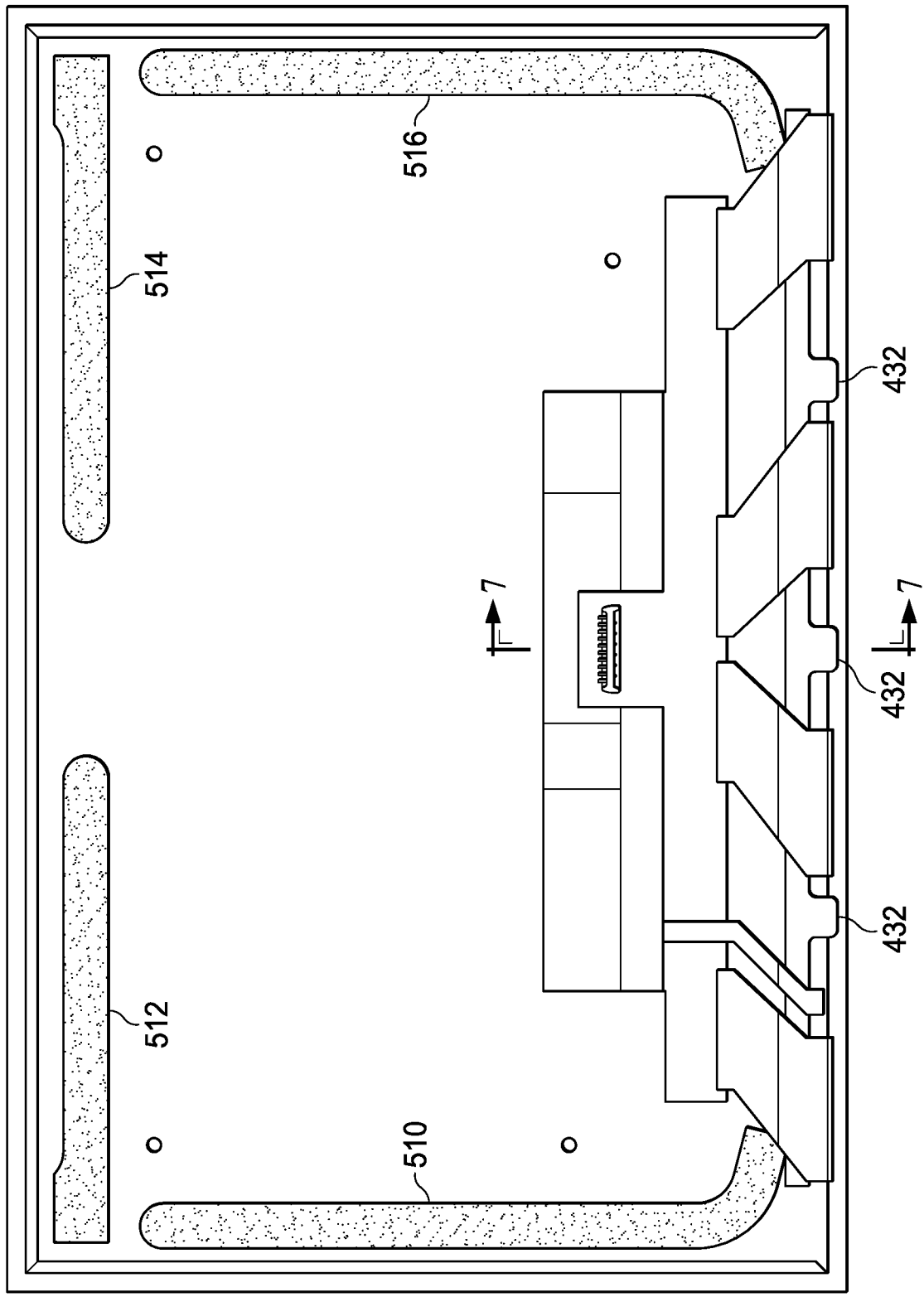
FIG. 5 shows a display cover portion facing breakaway view of a lid housing portion of a portable information handling system.

FIG. 5 shows a display cover portion facing breakaway view of a lid housing portion of a portable information handling system. In various embodiments, the display cover portion facing breakaway view provides a representation of various components of a liquid crystal module (LCM) of the portable information handling system.

During assembly, the rear display cover portion 316 is assembled to the display cover portion 314 using adhesive along the left, right and top edges of the lid housing portion 402. Specifically, adhesive strip 510 is used to adhere the left edge of the lid housing portion, adhesive strip 512, 514 are used to adhere the top edge of the lid housing portion 402 and adhesive strip 516 is used to adhere the right edge of the lid housing portion 402. The bracket tabs 432 hold the bottom edge of the rear display cover portion 316 to the display cover portion 314.

Figure 6:
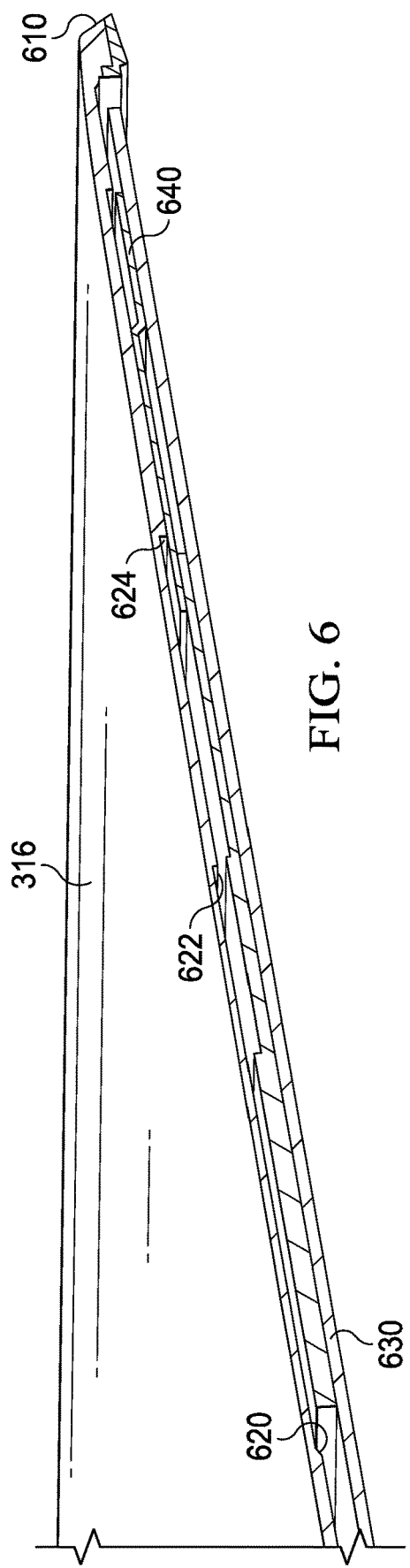
FIG. 6 shows a cross sectional, perspective view of a lid housing portion of a portable information handling system along lines 6-6 of FIG. 4.

FIG. 6 shows a cross sectional, perspective view of a lid housing portion of a portable information handling system along lines 6-6 of FIG. 4. In various embodiments, the rear display cover portion 316 (which corresponds to B-Cover 212) includes an edge portion 610 which is angled to provide a perception of a narrower Z axis form factor. In various embodiments, the interior the rear display cover portion 316 includes a plurality of tiered sections which correspond to the Z-axis height areas. In various embodiments, the plurality of tiered sections provide the rear display cover with progressive thickness towards the edges of the rear display cover portion 316. Providing these tiered sections provide additional strength to the domed lid housing portion of the rear cover. In various embodiments, the rear display cover (i.e., the A Cover) includes three tiered sections 620, 622, 624 which correspond the dome center height area 410, the mid height area 412 and the edge height area 414, respectively.

In various embodiments, the tiered height printed circuit board enables location of the highest components of the TCON of the information handling system toward the center of the lid housing portion 402 to provide an optimal A-cover dome profile. In various embodiments, the printed circuit board portion 422 is located within the tiered section 620 which generally corresponds to the dome center height area 414 of the lid housing portion 402. In various embodiments, the printed circuit board portion 420 is located within the tiered section 622 which generally corresponds to mid-tier height area 414 of the lid housing portion 402. In various embodiments, a display device communication portion 640 fits within the lowest tiered section 624. In various embodiments, other tall components (such as a camera logic component or a touch controller component) fit within the tiered section 420.

Figure 7:
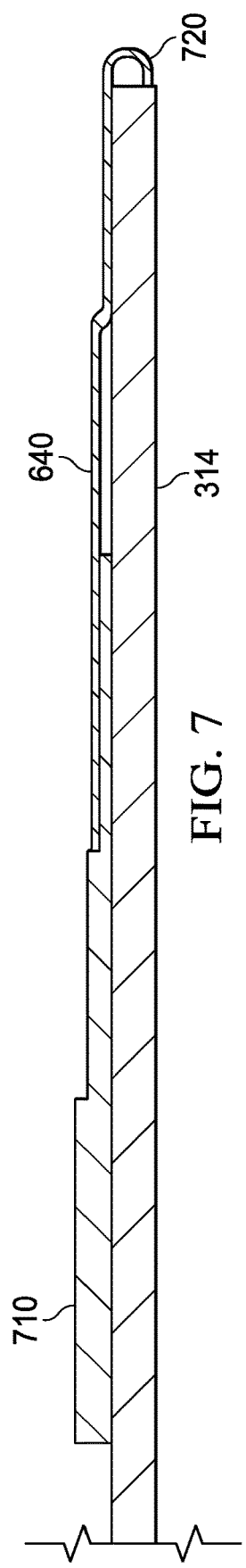
FIG. 7 shows a cross sectional view of a lid housing portion of a portable information handling system along lines 7-7 of FIG. 5.

FIG. 7 shows a cross sectional view of a lid housing portion of a portable information handling system along lines 7-7 of FIG. 5. The cross section view of the lid housing portion shows the gradient tethered LCM design of the PCB area of the lid housing portion. Specifically, in certain embodiments, a PCB 710 is tiered in height to correspond to the dome center height area 410, the mid-tier height area 412 and the edge height area 414, respectively. Additionally, in various embodiments, outside edges of the display device 315 are contiguous with a narrow bezel 720.

Figure 8:
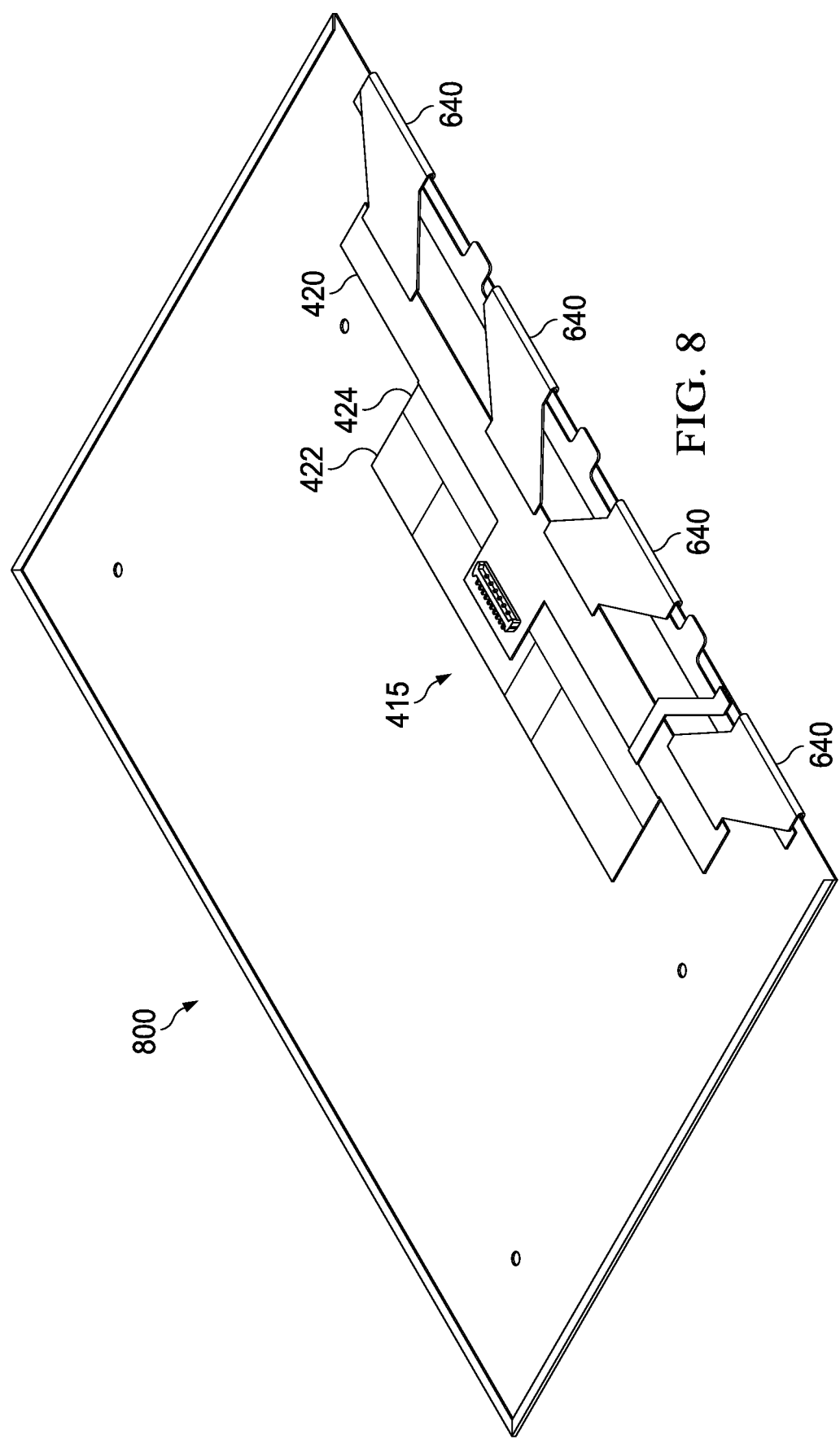
FIG. 8 shows a perspective view of a multi-level printed circuit board.

FIG. 8 shows a perspective view of a multi-level printed circuit board 800 within a display assembly. In various embodiments, the printed circuit board 415 includes a plurality of printed circuit board portions, each portion having a corresponding height. In various embodiments, the printed circuit board portion 420 has a corresponding height. In various embodiments, the printed circuit board portion 420 has a maximum height of 1.00 mm (+/−15%). In various embodiments, the printed circuit board portion 422 has a corresponding height. In various embodiments, the printed circuit board portion 422 has a maximum height of 1.65 mm (+/−15%). In various embodiments, the corresponding height of the circuit board portion 420 is different than the corresponding height of the circuit board portion 422. In various embodiments, the corresponding height of the circuit board portion 422 is taller than the corresponding height of the circuit board portion 420.

Other embodiments are within the following claims. For example, the display device communication portions 440, 442, 444, 446 may be configured such that communication portions 440 and 446 are jogged while communication portions 442 and 444 are substantially straight. Also for example, the display device communication portions 440, 442, 444, 446 may be configured to include source drivers to support a chip on film (COF) type display device.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A display chassis for a portable information handing system, comprising:
a display cover portion, the display cover portion comprising a display and a bezel, the display comprising an infinity display; and,
a rear cover portion, the rear cover portion comprising a timing controller (TCON), the timing controller comprising a first printed circuit board portion and a second printed circuit board portion, the first printed circuit board portion having a corresponding height, the second printed circuit board portion having a corresponding height, the corresponding height of the second printed circuit board portion being taller than the corresponding height of the first printed circuit board portion, the second printed circuit board portion being located within a dome center height area of the rear cover portion.

2. The display chassis of claim 1, further comprising:
a display device communication portion, the display device communication portion being jogged to couple with the first printed circuit board.

3. The display chassis of claim 2, wherein:
the lid housing portion comprises a plurality of display device communication portions, a first display device communication portion comprising a first signal path routing and a second display device communication portion comprising a second signal path routing.

4. The display chassis of claim 2, wherein:
the display device communication portion comprises a flexible printed circuit (FPC).

5. The display chassis of claim 1, wherein:
the rear cover portion comprises a rear cover; and,
the rear cover comprises a plurality of tiered sections located on an interior of the rear cover.

6. The display chassis of claim 1, wherein:
the rear cover portion comprises a mid height area; and,
the first circuit board portion and an edge of the display device communication portion are located within the mid height area.

7. An information handling system comprising:
a processor;
a data bus coupled to the processor; and
an information handling system chassis housing, the housing comprising a base chassis, the base chassis housing the processor; and,
a display chassis, the display chassis comprising
a display cover portion, the display cover portion comprising a display and a bezel, the display comprising an infinity display; and,
a rear cover portion, the rear cover portion comprising a timing controller (TCON), the timing controller comprising a first printed circuit board portion and a second printed circuit board portion, the first printed circuit board portion having a corresponding height, the second printed circuit board portion having a corresponding height, the corresponding height of the second printed circuit board portion being taller than the corresponding height of the first printed circuit board portion, the second printed circuit board portion being located within a dome center height area of the rear cover portion.

8. The information handling system of claim 7, further comprising:
a display device communication portion, the display device communication portion being jogged to couple with the first printed circuit board.

9. The information handling system of claim 8, wherein:
the lid housing portion comprises a plurality of display device communication portions, a first display device communication portion comprising a first signal path routing and a second display device communication portion comprising a second signal path routing.

10. The information handling system of claim 8, wherein:
the display device communication portion comprises a flexible printed circuit board (FPC).

11. The information handling system of claim 7, wherein:
the rear cover portion comprises a rear cover; and,
the rear cover comprises a plurality of tiered sections located on an interior of the rear cover.

12. The information handling system of claim 7, wherein:
the rear cover portion comprises a mid height area; and,
the first circuit board and an edge of the display device communication portion are located within the mid height area.

* * * * *